United States Patent Office 3,189,504
Patented June 15, 1965

3,189,504
METHOD OF METALLIZING CERAMICS OR THE LIKE
Francis F. Whittle, Elmira, and Lee C. Williams, Big Flats Township, Chemung County, N.Y., assignors to Westinghouse Electric Corporation, East Pittsburgh, Pa., a corporation of Pennsylvania
No Drawing. Filed Jan. 8, 1960, Ser. No. 1,171
8 Claims. (Cl. 156—234)

This invention relates to methods of forming metallized coatings on solid insulating members and particularly to methods for forming a metallized coating on ceramics or the like.

Ceramics and other solid insulating materials are in wide use in the electronic tube art because of their mechanical strength and ability to withstand high temperatures. Utilizing such members often requires the formation of a bond between the member and an adjacent member of similar material or of metal. For example, refractory insulating members of ceramic material are sometimes desirable for use as the envelope structure of an electronic tube because of its superior qualities as compared to conventional glass. For this purpose, vacuum-tight ceramic-to-ceramic and ceramic-to-metal seals are required. Other applications require seals of similar high quality. Problems in forming seals between high temperature glass members or a high temperature glass member and a metal are very similar. All high temperature, refractory, insulating materials are to be considered as included in the following discussion wherein the term "ceramics" is employed. It is desirable in such applications that a high strength braze be provided without metal material being exposed on adjacent ceramic surfaces where tube performance may be interfered with as by the formation of undesired conductive paths. Furthermore, it is, of course, desirable that the method employed to make the seal require little time and expense for both equipment and labor.

It is desirable to have a uniform, controlled thickness of metallizing to provide seals of optimum strength and vacuum tightness. The metal powder of the metallizing must be in intimate contact with the ceramic surface so that the desired reaction can occur during sintering. If the applied metallized coating is too thin, the reaction with the ceramic during sintering will produce a coating that is not continuous. Since molten brazes, such as silver, copper, gold, or alloys thereof, will not wet or adhere to a bare ceramic surface, seals made by brazing to thin metallized coatings are likely to be mechanically weak. Also, if the bare ceramic areas are extensive enough, leaky seals result due to interconnecting paths. Thickly applied metallizing coatings yield thick sintered coatings. Seals formed from such coatings, while mechanically strong, are likely to leak since the molten braze material does not readily penetrate the pores left between sintered metal particles; as a result, passage of gas through the layer of the sintered metallizing may occur.

According to prior art methods, the process of making a ceramic-to-metal seal generally comprises the formation of a slurry of suitable metallic material such as molybdenum and manganese, for example, applying the slurry to the ceramic surface, sintering to effect a bond of the metallic particles to the ceramic, and plating to give a surface which molten brazes will wet and flow over. A ceramic having a metallized coating formed in this manner may then be brazed to a mating metal part or to another ceramic member having a similar metallized coating. Methods used to apply the slurry to the ceramic surface, that is, the metallizing step, have been spraying, painting, dipping and printing. Each of these methods has certain advantages and also certain disadvantages. As was beforementioned, it is desirable to form a metallized coating having a uniform thickness which is controllable within certain limits and which covers only the area of the ceramic surface which is to be brazed. Spraying, while good as a method of forming a coating of uniform thickness, is difficult to control to form a coating of a particular desired thickness. The quality of a painted coating is very much dependent on manual skills which are neither efficient nor readily reproducible. Dipping provides a rapid method of forming the coating but it is difficult to obtain a uniform thickness by this method. Printing generally requires that expensive equipment be employed. A further problem in all of the aforementioned methods is that during the processing time evaporation of solvent from the slurry causes the slurry to change in viscosity. The latter problem is encountered because in all of these methods the slurry is necessarily applied directly to the ceramic surface to be metallized. If the slurry is made up in any appreciable quantity substantial evaporation will occur before it is entirely used. As a result thickness control is difficult to attain.

It is, therefore, a principal object of the present invention to provide an improved method of forming a metallized coating.

It is another object of this invention to provide an improved method of forming ceramic-to-metal and ceramic-to-ceramic seals which have better vacuum tightness and improved reliability.

Another object is to provide a metallized coating on a ceramic member of uniform thickness.

Another object is to provide a metallized coating on a ceramic member of controlled thickness.

Another object is to provide a coating on a ceramic member of an area only as large as that surface of the ceramic which is to be incorporated in a seal.

Another object is to provide a method of forming a metallized coating which may be performed rapidly and reproducibly without requiring expensive equipment or highly skilled operators.

These and other objects of this invention, and the manner in which they are achieved, will be apparent from the following description.

The general method of forming a metallized coating according to the present invention comprises the making of a slurry of the metallic constituents to be coated in a suitable medium which may comprise, for example, a binder and a solvent. The slurry is poured onto a smooth surface, such as a glass plate, which may be inclined, to obtain the proper film thickness. The solvent is then allowed to evaporate leaving a coherent film of metallic material in the binder which may be readily removed from the glass plate.

The film may then be applied to the ceramic member by a variety of methods. The film may be brought into intimate contact with the ceramic surface to be metallized, which has been previously coated with a solvent. The solvent causes softening of the binder of the film so that the film is adherent to the ceramic surface. An alternative, of course, is to cut the film and apply the preformed portions onto the wetted ceramic surfaces.

A preferable method, however, is to remove the metallized film from the surface on which it is formed and place it on another surface to which the metallized film will not adhere when wet by the solvent. The surface on which the film is formed may, of course, be used if the binder of the film will not appreciably stick to it when wet by solvent. The member to be metallized is then brought into contact with the film while it remains on the surface. While a metallized coating of similar quality may be formed by any of the just-mentioned methods, the last-mentioned method has been found preferable because of the rapidity with which such coatings may be formed lending the method to an operation wherein many objects are metallized in a continuous process.

A thin sheet of a suitable material such as polyethylene or acrylic resin, having a thickness of about 1 mil, may be used as a backing in the formation of the metallized film, if desired. It has been found, however, that the quality of the film formed on a smooth, hard surface such as glass is of superior quality to that formed on an intermediate layer of material. Removal of the film from the glass plate is readily accomplished without the use of an intermediate layer.

The following is one specific example of the metallizing process carried out in accordance with this invention. The slurry of metallic material comprises:

| | Grams |
|---|---|
| Molybdenum powder | 80 |
| Manganese powder | 20 |
| A 10 to 1 solution of butyl Cellosolve and nitrocellulose of 30 seconds viscosity | 75 |
| Butyl alcohol | 75 |

The foregoing constituents were placed together in a one quart mill with a charge of approximately 650 grams of ½ inch diameter porcelain balls and milled for a period of from 18 to 20 hours to insure homogeneity.

The resulting slurry is poured from the mill onto a detergent washed flat glass plate inclined about 80° with the horizontal. The pouring operation is preferably carried out soon after the milling operation so that no substantial viscosity change occurs due to evaporation of solvent. The foregoing slurry recipe provides a quantity of material sufficient to cover about six 12″ by 18″ plates. The pouring rate is determined by the flow of the material on the plate. That is, excess material permitted to drip off the bottom of the plate will probably be wasted unless salvaging means are provided. The film is allowed to dry in air or, alternatively, drying may be accelerated by gently blowing warm air over the surface. The portion of the dried film on the bottom edge of the glass plate of about ½ inch wide is generally not of uniform thickness with the remainder of the film and therefore should not be used. The remainder of the film is found to be of a thickness of 0.0012 inch plus or minus 0.0002 inch over the entire surface. The metallized film is then removed from the glass plate and stored for use at any desired future time. The film consists substantially of the metallic constituents of the slurry held together by the binder which in the above example is nitrocellulose.

Films formed according to the above example may be applied to ceramic objects made of various materials which include, for example, sapphire, forsterite, steatite, electrical porcelain, beryllium oxide and zircon porcelain. The ceramic object is coated on the surface to be metallized with butyl Cellosolve and then brought into contact with the film. Some care should be excersied so that the butyl Cellosolve, or other solvent used, uniformly wets the ceramic surface. The film may be placed on a surface having some resiliency so that intimate contact between the ceramic and the film is insured. It is also desirable in some cases to employ an absorbent, as well as resilient backing surface to absorb excess solvent so that a rather sharply defined pattern of wetted film can be obtained. After being pressed firmly in contact with the metallized film for approximately 3 to 5 seconds, the binder of the film is softened and becomes adherent to the ceramic surface. Upon removing the ceramic object, a portion of the metal film of an area and shape the same as the surface of the object remains thereon. That is, the portion of the film which has had the binder therein softened readily separates from the unsoftened portion when the ceramic object is moved relative to the dry portion. In accordance with this invention, it is only a matter of convenience whether the film is physically moved into contact with the ceramic or vice versa. The resulting metallized coating is the same. Handling of the ceramic members is generally more convenient than the film so a preferred method of practicing the invention is to successively bring members to be metallized into contact with the film. The effect on the film is, of course, similar to that of a cookie cutter on a sheet of dough. When no useful portion of the film remains, the scraps may be discarded or returned to a slurry, as desired.

It is therefore seen that the process in accordance with the present invention may be carried out without requiring precise controls of either a mechanical or manual nature. High speed is an inherent quality of this process and yet the metallized ceramics resulting therefrom are also found to be of extremely high quality enabling formation of seals of maximum strength and tightness. Furthermore, material is used economically in that the entire film may be used or remaining portions may be returned to the metal slurry. Another desirable feature is that the films in accordance with this invention need not be immediately applied to the ceramic bodies but may be stored for long periods of time without damage thereto. Furthermore, the films are not fragile and may be readily handled without endangering their uniform properties. High strength of a seal formed with a metallized coating made in accordance with this invention is insured because of the uniformity and controlled thickness of the coating made possible because little evaporation of solvent occurs before pouring of the slurry to form the films.

The slurry composition formed in the above specific example is similar to that used in the prior art methods of painting, spraying, etc. insofar as the metallic constituents and solvent are concerned. Many other compositions may be applied in accordance with the present invention. For example, the metallic, or metallic oxide, constituents may comprise numerous metals either singly or mixed and may include tungsten, iron, titanium, silicon, thorium, chromium, nickel, zirconium or others. The metallic or metallic oxide constituents that are used depend on the composition of the ceramic that is to be metallized and may be readily determined by those skilled in the art. The well known titanium hydride process of metallizing ceramics may also employ the teaching of the present invention. To do so, the procedures set forth in the above example may be followed with the exception that the molybdenum and manganese would be replaced by an approximately equal amount of titanium hydride.

Two solvents are employed in the liquid carrier of the slurry of the above example because they are compatible in solution and produce desirable viscosity and evaporation rates. They allow the film to be stripped easily from the glass plate after drying. They evaporate leaving the nitrocellulose unaltered and uniformly distributed.

The solvents employed as a carrier or vehicle in the slurry given as an example above are merely typical of the type which may be employed in the practice of the present invention. Others which may be used, include acetone, toluene, and most ketones and aromatics. Drying rates, viscosity, desired film thickness, compatibility in solution, amount of binder, amount of residue after firing, drying surface and other similar factors determine which solvents should be used to the best advantage for a particular application. Appropriate solvents for any particular application may be readily determined by one skilled in the art.

Butyl Cellosolve is employed in the slurry and on the ceramic to be metallized because nitrocellulose, given as an example of a binder, is soluble therein. Other binders may be employed such as methacrylates, and acetates. The binder chosen should preferably leave a minimum of residue after it has been decomposed by firing subsequent to the metallizing step.

The material used to wet the ceramic surface prior to application of the film should be capable of at least softening the binder employed therein and may be a material such as those just previously named for use as the slurry vehicle. In selecting the solvent other things must be considered besides the most obvious, i.e., the softening of the binder. The evaporation rate must be such that there is sufficient time to wet the body and carry it to the film before the solvent evaporates completely. The solvent must also stay only on the surfaces to be metallized. It should not run to other surfaces and cause the film to adhere to those surfaces. The solvent must not evaporate until the binder has been softened sufficiently to allow the metallizing to adhere to the ceramic and separate from the dry, parent film. The evaporation rate must be fast enough so that when the film adheres to the ceramic the solvent will evaporate readily so that the film will not be disturbed and the part can be put down. Uniformity of the film after this process is of paramount importance along with intimate contact between the film and the ceramic.

Again, other parameters which effect the selection of the solvent must be viscosity, amount of residue after firing, solubility of binder, drying rates of the coated ceramic and other similar factors determine which solvent should be used to the best advantage of a particular application.

The above considerations, which are to some extent important in selecting a wetting solvent to use in the present invention, do not, obviously, make such selection a critical one since these considerations bear only upon the degree to which the method provides a commercially useful article at lowest cost. The selection of a useful wetting solvent may be readily made by anyone skilled in the art.

While the present invention has been shown in only a few forms, it will be obvious to those skilled in the art that it is not so limited but is susceptible to various changes and modifications without departing from the spirit and scope thereof.

We claim as our invention:

1. The method of forming a metallized coating on a ceramic member comprising the steps of making a slurry comprising a powdered metal containing material, a binder and a liquid carrier, pouring said slurry onto a smooth surface, allowing said liquid carrier to evaporate to form a coherent film of said metal in said binder, wetting the ceramic surface to be metallized with a solvent and forcing said film and said surface into intimate contact so that said film adheres to said wetted surface.

2. The method of forming a metallized coating on a ceramic member comprising the steps of making a slurry comprising a powdered metal containing material, a binder and a liquid carrier, pouring said slurry onto a smooth planar surface, allowing said liquid carrier to evaporate to form a coherent film of said metal in said binder, wetting the ceramic surface to be metallized with a solvent, forcing said film and said surface into intimate contact to soften the binder of said film so that said film adheres to said surface.

3. The method of forming a metallized coating on a ceramic member comprising the steps of making a slurry comprising a powdered metal, a binder and a liquid carrier, pouring said slurry onto a smooth planar surface inclined at an angle to the horizontal, allowing said liquid carrier to evaporate to form a coherent film of said metal in said binder, coating the ceramic surface to be metallized with a material in which said binder is at least partially soluble, positioning said ceramic surface adjacent to said film, forcing said ceramic surface and said film into intimate contact so that the binder of said film is softened at the surface thereof next to the ceramic surface such that an adhesive bond is formed.

4. The method of forming a metallized coating on a ceramic member comprising the steps of making a slurry comprising a powdered metal, a binder and a liquid carrier, pouring staid slurry onto a smooth, planar surface inclined at an angle to the horizontal, allowing said liquid carrier to evaporate to form a coherent film of said metal in said binder, stripping said film from said surface, removing a portion of said film having an area and pattern of that of the ceramic surface to be metallized, wetting the ceramic surface to be metallized with a solvent, forcing said film and said surface into intimate contact until adhesion occurs therebetween.

5. The method of forming a metallized coating on a ceramic member comprising the steps of making a slurry comprising a powdered metal, a binder and a liquid carrier, pouring said slurry onto a smooth, planar surface inclined at an angle to the horizontal, allowing said liquid carrier to evaporate to form a coherent film of said metal in said binder, stripping said film from said smooth planar surface, wetting the ceramic surface to be metallized with a solvent in which said binder is at least partially soluble, positioning said film adjacent to said surface, forcing said film and said surface into intimate contact so that solvent on said surface contacts a portion of said film having an area and pattern like that of said surface, removing the portion of said film not in contact with said surface to cause an adherent metallized coating to remain on said surface.

6. The method of forming a metallized coating on a plurality of ceramic surfaces of one or more ceramic members comprising the steps of forming a mixture of a powdered metal, a binder and a liquid carrier, milling said mixture to produce a homogeneous slurry, pouring said slurry onto a smooth, planar surface inclined at an angle to the horizontal, allowing said liquid carrier to evaporate to form a coherent film of said metal in said binder, wetting uniformly the ceramic surfaces to be metallized with a solvent in which said binder is at least partially soluble, bringing a first ceramic surface into contact with said film to cause a first matching portion of said film to adhere thereto, removing said first ceramic surface to separate said first matching portion from the first remaining portion of said film, bringing a second ceramic surface into contact with said first remaining portion of said film to cause a second matching portion of said film to adhere thereto and removing said second ceramic surface to separate said second matching portion from the second remaining portion of said film.

7. A method of forming a film of powdered metal containing material comprising the steps of: making a slurry comprising a powdered metal, a binder and a liquid carrier; pouring said slurry onto a smooth, planar surface inclined at an angle to the horizontal; allowing said liquid carrier to evaporate to form a coherent film of said metal in said binder; and stripping said film from said smooth, planar surface.

8. A method of forming a metallized coating on a ceramic surface comprising the steps of providing a film of material containing powdered metal and a soluble binder, wetting said ceramic surface with a material which acts as a solvent to said binder, backing said film with a resilient backing surface and bringing said wetted ceramic into intimate contact with said film whereby said film adheres to said ceramic and that portion which adheres to said ceramic is separated from any remaining film portion in a cookie cutter type action.

References Cited by the Examiner
UNITED STATES PATENTS

| | | |
|---|---|---|
| 1,824,690 | 9/31 | Schneider. |
| 2,776,235 | 1/57 | Peck. |
| 2,872,340 | 2/59 | Newman et al. |
| 2,957,207 | 10/60 | Roop et al. 18—48 |

EARL M. BERGERT, *Primary Examiner.*

ALEXANDER WYMAN, *Examiner.*